(12) United States Patent
Yamamiya

(10) Patent No.: US 12,139,331 B2
(45) Date of Patent: Nov. 12, 2024

(54) ARTICLE STORAGE CONTAINER AND ARTICLE FEEDER

(71) Applicant: Asahi Seiko Co., Ltd, Tokyo (JP)

(72) Inventor: Takahito Yamamiya, Saitama (JP)

(73) Assignee: ASAHI SEIKO CO., LTD, Tokyo (JP)

( * ) Notice: Subject to any disclaimer, the term of this patent is extended or adjusted under 35 U.S.C. 154(b) by 307 days.

(21) Appl. No.: 17/952,981

(22) Filed: Sep. 26, 2022

(65) Prior Publication Data

US 2023/0096019 A1    Mar. 30, 2023

(30) Foreign Application Priority Data

Sep. 29, 2021 (JP) ................... 2021-158602

(51) Int. Cl.
*B65G 1/04* (2006.01)
(52) U.S. Cl.
CPC ...................... *B65G 1/04* (2013.01)
(58) Field of Classification Search
CPC ...................................................... B65G 1/04
USPC ....... 221/258, 226, 197, 213, 248, 210, 230, 221/217, 259, 232, 277
See application file for complete search history.

(56) References Cited

U.S. PATENT DOCUMENTS

| | | | | |
|---|---|---|---|---|
| 7,628,291 B2* | 12/2009 | Tasso | .................. | G07F 11/16 221/69 |
| 8,087,837 B2 | 1/2012 | Fukumasu | | |
| 8,646,652 B2* | 2/2014 | Ohta | .................. | G06K 13/067 221/217 |
| 10,102,705 B2 | 10/2018 | Yamamiya | | |
| 10,210,695 B2 | 2/2019 | Yamamiya | | |
| 2015/0154822 A1* | 6/2015 | Tsai | .................. | G07F 17/42 221/151 |

(Continued)

FOREIGN PATENT DOCUMENTS

| | | |
|---|---|---|
| CA | 2231131 | 6/1999 |
| JP | 2008-247521 | 10/2008 |
| JP | 2015-230526 | 12/2015 |

(Continued)

OTHER PUBLICATIONS

Extended European Search Report received in EP Application No. 22191340.3, dated Feb. 23, 2023.

(Continued)

*Primary Examiner* — Gene O Crawford
*Assistant Examiner* — Ayodeji T Ojofeitimi
(74) *Attorney, Agent, or Firm* — GREENBLUM & BERNSTEIN, P.L.C.

(57) ABSTRACT

The present invention provides an article storage container and an article feeder by which an article stored in the article storage container cannot be taken out easily and by which the article in the article storage container cannot be taken out easily when the article storage container is attached to and detached from the article feeder. The article storage container includes a lock mechanism in a shutter, and includes an opening/closing restriction mechanism configured to control the opening and closing of the shutter according to whether the article storage container is attached to or detached from the article feeder. The article storage container can be mounted on the article feeder only when the shutter is closed, and the shutter can be opened only after the article storage container is mounted on the article feeder.

13 Claims, 11 Drawing Sheets

(56) References Cited

U.S. PATENT DOCUMENTS

2016/0012660 A1\* 1/2016 Yamamiya .............. G07F 11/04
                                                                                                    221/258
2016/0272406 A1 9/2016 Massey et al.

FOREIGN PATENT DOCUMENTS

| JP | 2016-175713 | 10/2016 |
| JP | 2016-201054 | 12/2016 |
| JP | 6145607 | 6/2017 |

OTHER PUBLICATIONS

Japan Office Action issued in JP Application No. 2021-158602, dated Dec. 22, 2023.

\* cited by examiner

ARTICLE STORAGE CONTAINER AND ARTICLE FEEDER

BACKGROUND OF THE INVENTION

1. Field of the Invention

The present invention relates to an article storage container that stores articles while stacking them one on top of another, and an article feeder that feeds the articles stored in the article storage container.

2. Description of the Related Art

Devices are known which store articles in a storage container while stacking them one on top of another and feed each of the articles located at the lowest position one by one.

For example, Japanese Patent No. 6145607 describes a device that feeds articles stacked in a line in a storage container one by one. This device feeds the articles stored in the storage container to the outside by pushing them out using a movable body. The storage container is attachable to and detachable from the device. The articles are loaded with the storage container detached from the device.

The storage container substantially has the shape of a rectangular parallelepiped. In the storage container, box-shaped articles are stored in a stacked state. The storage container includes an outlet port in a lowest portion on the front side thereof. One of the articles located at the lowest position out of the stacked articles is pushed in a horizontal direction from the back side to the front side to be fed through the outlet port. The outlet port has a height that allows one article to pass therethrough but does not allow two articles to pass therethrough at a time. The article located at the second lowest position is also dragged by the article located at the lowest position but is prevented from being fed by the outlet port. A back surface of the storage container, which is opposite a front surface thereof, includes an opening that allows the movable body to pass therethrough but does not allow the articles to pass therethrough. The movable body enters the storage container through this opening. In addition, a bottom surface of the storage container is divided at its center into segments across an area ranging from the back surface to the front surface, and the movable body passes through these segments. Each article is supported by the bottom surface thus divided on both sides. The center of the bottom surface constitutes a passage for a shaft that drives the movable body. The movable body moves from the back side to the front side while pushing the article located at the lowest position of the storage container. The article is pushed by the movable body to be fed through the outlet port. The article located at the second lowest position becomes a state of being placed on the movable body. After the article is fed, the movable body moves downward and then moves from the front side to the back side. At this time, the article placed on the movable body is placed on the bottom surface of the storage container.

However, in the existing technique, an article can be taken out through the outlet port of the storage container while the storage container is detached from the device. This brings about problems that an article accidentally drops off from the storage container when the storage container is attached to and detached from the device and that an article is pulled out of the storage container on purpose.

For this reason, a storage container by which an article cannot be taken out easily through an outlet port has been requested. In addition, a storage container and a device by which an article cannot be taken out easily from the storage container when the storage container is attached to and detached from the device have been requested.

SUMMARY OF THE INVENTION

An article feeder of the present invention is characterized by including: an article storage container which stores articles stacked one on top of another; a movable body which pushes one of the articles located at the lowest position out of the articles stored in the article storage container and feeds the article to the outside of the article storage container; a support rack on which to mount the article storage container; an outlet port which is provided in the article storage container and used for the article to be fed to the outside; a shutter which is provided in the article storage container and configured to open and close the outlet port; a first contact portion which is connected to the shutter; a first engagement portion which is configured to engage with the first contact portion; and a to-be-contacted portion which is provided in the middle of a route used for mounting the article storage container on the support rack, comes into contact with the first contact portion when the shutter is open, and does not come into contact with the first contact portion when the shutter is closed, characterized in that the first contact portion and the first engagement portion engage with each other by opening the shutter and the first contact portion and the first engagement portion disengage from each other by closing the shutter in a state where the article storage container is mounted on the support rack, detachment of the article storage container from the support rack is not prevented by the first contact portion and the first engagement portion when the article storage container is mounted on the support rack with the shutter closed, and the detachment of the article storage container from the support rack is prevented by the first contact portion and the first engagement portion when the article storage container is mounted on the support rack with the shutter open, and mounting of the article storage container on the support rack is not prevented by the first contact portion and the to-be-contacted portion in the case of mounting the article storage container on the support rack with the shutter closed, and the mounting of the article storage container on the support rack is prevented by the first contact portion and the to-be-contacted portion in the case of mounting the article storage container on the support rack with the shutter open.

An article storage container of the present invention is one which is configured to store articles stacked in a line, the article storage container being characterized by including: a case which stores the articles; an outlet port which is provided below a front surface of the case and used for feeding the articles to the outside; a shutter which is configured to open and close the outlet port; a shutter lock which is configured to perform an operation of opening and closing the shutter; and a first contact portion which is connected to the shutter and configured to engage with or disengage from a first engagement portion that is disposed in a support rack which is disposed outside the article storage container and on which to mount the article storage container.

According to the present invention, the article stored in the article storage container cannot be taken out easily. In addition, the article in the article storage container cannot be taken out easily when the article storage container is attached to and detached from the article feeder. Thereby, it is possible to improve the security of the article storage container and the article feeder.

DESCRIPTION OF THE PREFERRED EMBODIMENT

Hereinbelow, an embodiment of the present invention is described in detail with reference to FIGS. 1 to 11. These drawings are each illustrated only schematically to the extent that the present invention can be understood sufficiently. Accordingly, the present invention is not limited to the illustrated example. In addition, in each drawing, common or similar constituents are assigned the same reference signs, and their redundant description is omitted here.

Figure 1:
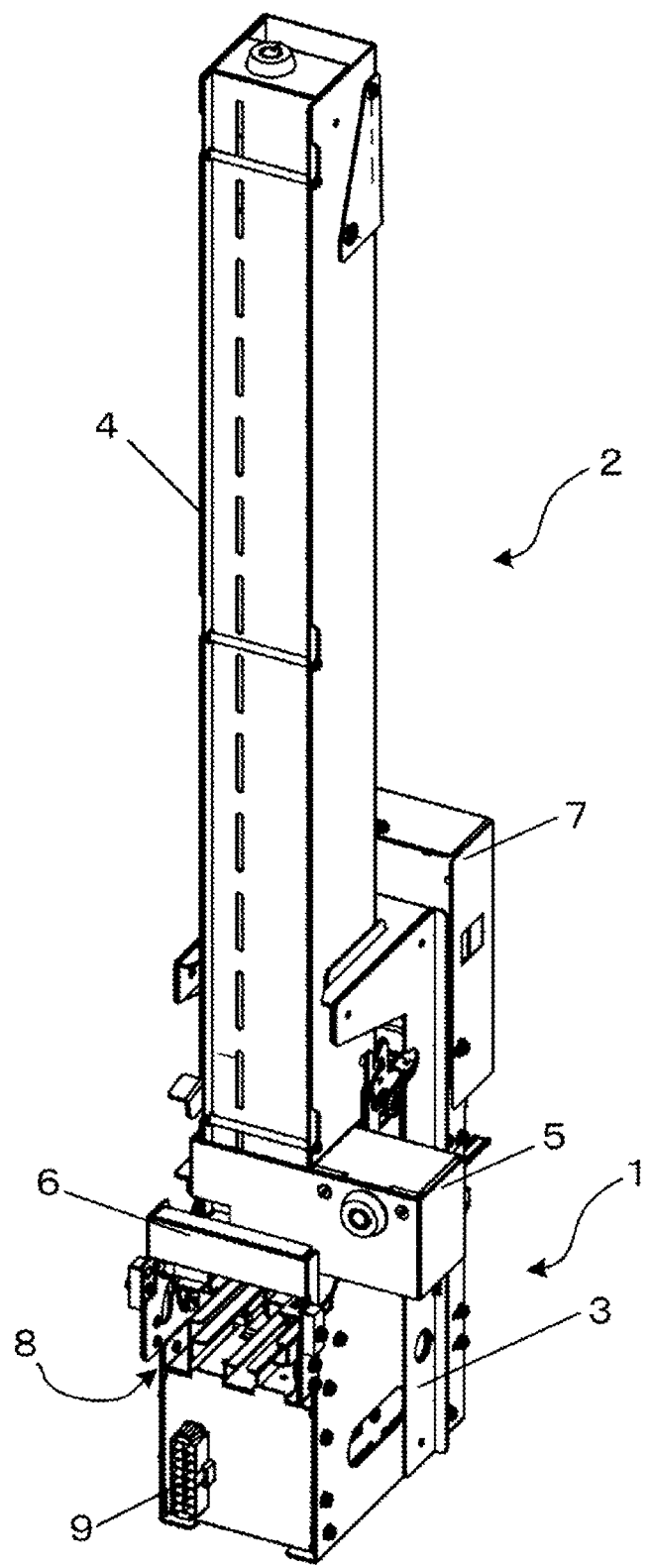
FIG. 1 is a perspective view of an article feeder with an article storage container mounted thereon.

First, an article feeder is described using FIG. 1. FIG. 1 is a perspective view of an article feeder with an article storage container mounted thereon.

An article storage container 2 is attached to and detached from an article feeder 1. With the article storage container 2 mounted thereon, the article feeder 1 can feed an article stored in the article storage container 2 to the outside through a feed opening 8. The article feeder 1 feeds each of articles, stored in the article storage container 2, located at the lowest position one by one. Each article preferably has a predetermined and uniform thickness and has a solid form. In addition, since an upper surface of one of the articles and a bottom surface of another come into contact with each other when they are stacked one on top of another, these surfaces are preferably flat so as not to get caught on each other. For example, the articles may be box-shaped ones, ones stored in cases, medals or tokens, and may be circular or polygonal ones in a top view. The articles stored in the article storage container 2 are preferably ones of the same height and more preferably ones of the same shape because they are stored while being stacked one on top of another. The articles may be spherical or oval bodies as long as they have the same height. The article storage container 2 includes: a case 4; and a feed unit 5. The case 4 is a case that stores the articles while stacking them one on top of another. For example, the articles are stored in the case 4 while being stacked in a line. The feed unit 5 includes an article outlet port. For example, the article feeder 1 is embedded in an article vending machine, and feeds an item in exchange for receiving the cost inserted.

The article feeder 1 includes: a movable body configured to push out and feed the articles; a drive unit including a drive mechanism of the movable body; a mounting mechanism including a rack on which to mount the article storage container 2 and a moving mechanism which moves the rack; a frame 3 on which these components are installed; and a control unit 7 configured to control the article feeder 1. For example, the moving mechanism of a support rack 10 is a linkage mechanism. The article feeder 1 includes, on its front side: the feed opening 8; and a connector 9. The feed opening 8 is an outlet through which the articles are fed to the outside from the article feeder 1. The article feeder 1 is connected to an external device via the connector 9, and signals are input and output between the article feeder 1 and the external device. In addition, the external device provides power supply to the article feeder 1. Further, the article feeder 1 includes a shielding plate 6 on its front side, which makes the articles not accessible when the article storage container 2 is attached to and detached from the article feeder 1.

Figure 2:
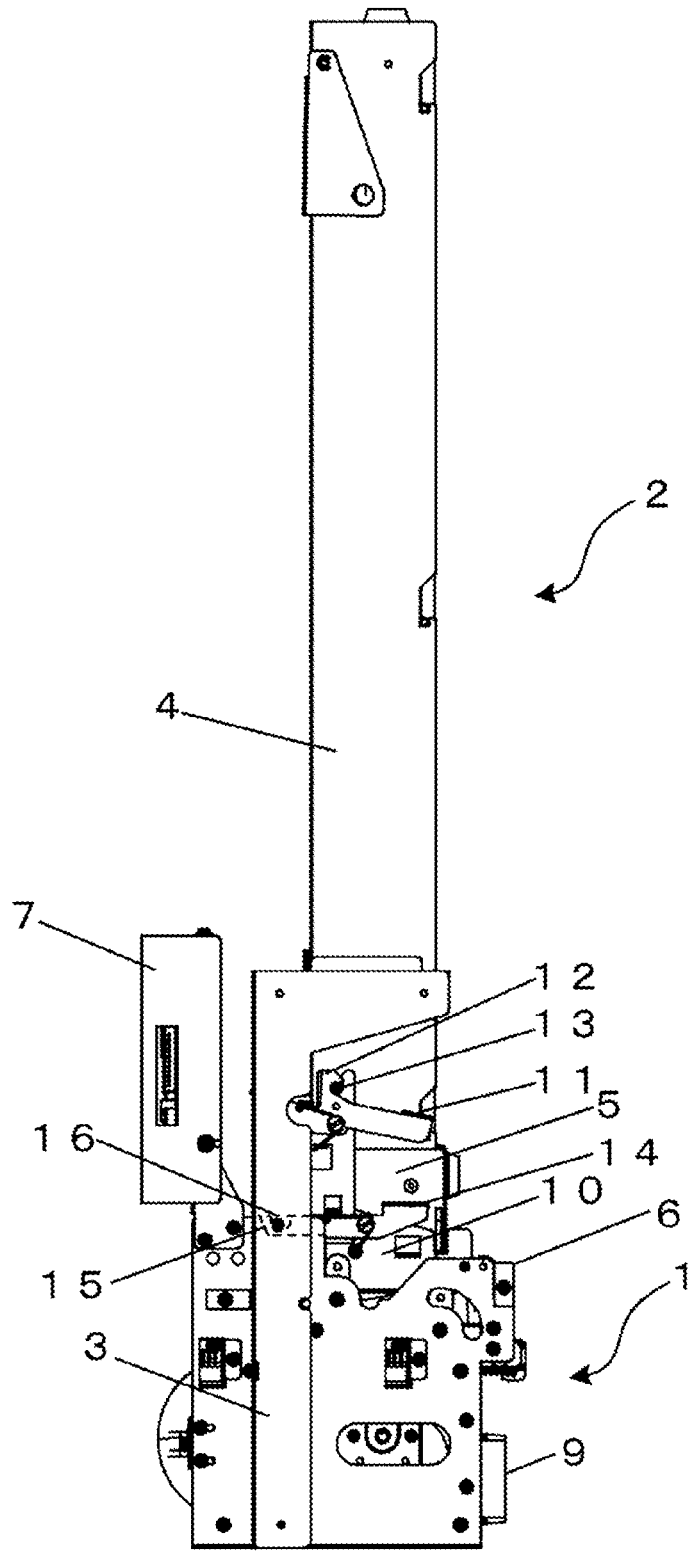
FIG. 2 is a side view of the article feeder with the article storage container located at a first position.
Figure 3:
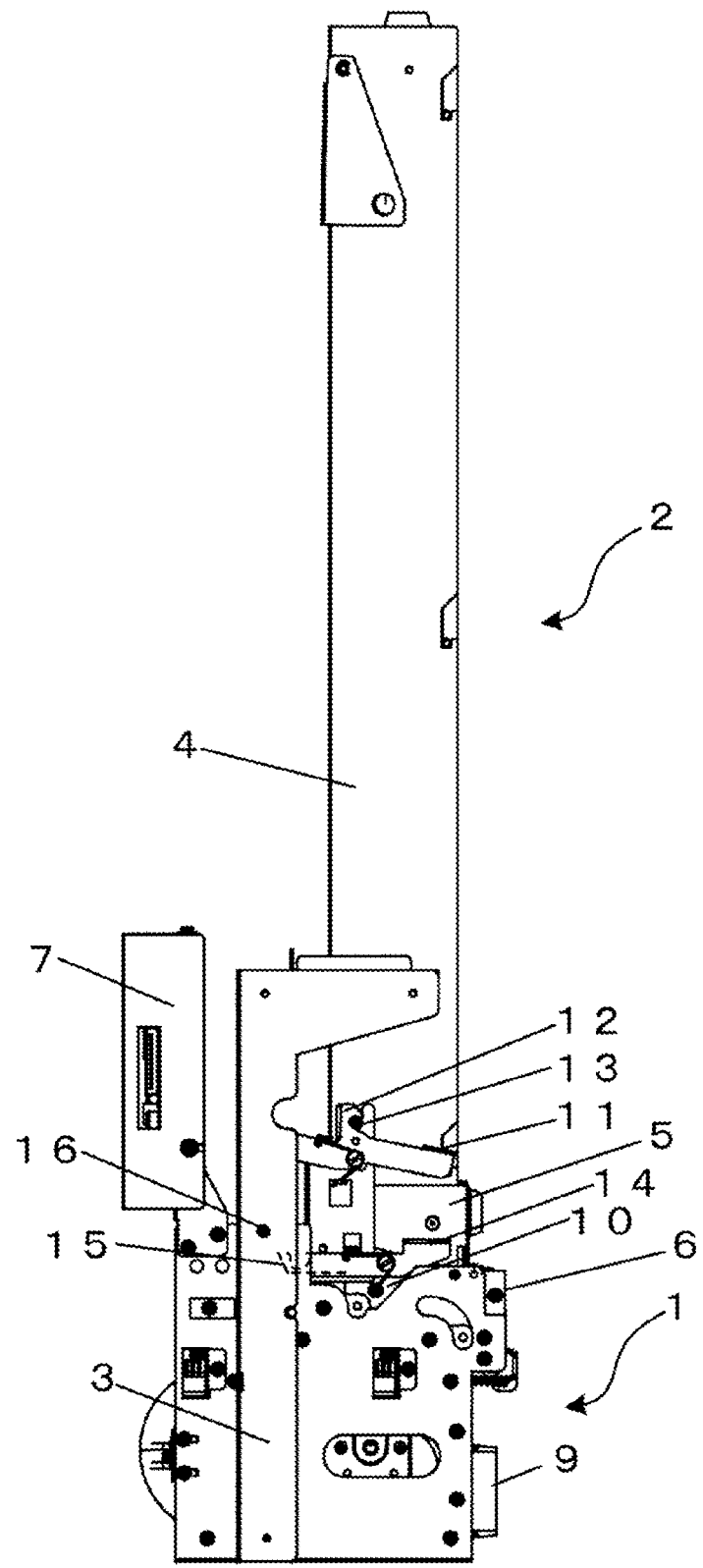
FIG. 3 is a side view of the article feeder with the article storage container located at a second position.

Next, using FIGS. 2 and 3, a description is given of how the article storage container 2 is mounted on the article feeder 1. FIG. 2 is a side view of the article feeder with the article storage container located at a first position. FIG. 3 is a side view of the article feeder with the article storage container located at a second position. The article feeder 1 is used with the article storage container 2 mounted thereon. The article storage container 2 is attachable to and detachable from the article feeder 1.

The article feeder 1 includes the support rack 10 on which to mount the article storage container 2. The support rack 10 moves between: the first position where the article storage container 2 can be mounted or detached; and the second position where the articles can be fed from the article storage container 2. FIG. 2 is a view observed when the support rack 10 is located at the first position whereas FIG. 3 is a view observed when the support rack 10 is located at the second position.

Mounting pins 13 are pins fixed on side surfaces of the case 4. The mounting pins 13 are respectively arranged on the side surfaces of the case 4 that are opposed to each other. A mounting lever 11 is turnably provided on the support rack 10. The mounting lever 11 is provided at its distal end a mounting hook 12 to be hooked on one of the mounting pins 13. The other mounting pin 13 provided on the opposed side surface of the case 4 also has its corresponding mounting hook 12, and these two mounting hooks 12 are connected to each other via a connecting shaft provided on the back side of the case 4 and work in conjunction with each other. The article storage container 2 can be fixed on the support rack 10 by hooking the mounting hooks 12 on the mounting pins 13.

A fixing bar 16 is a round bar that is provided on the frame 3 and extends in the width direction of the article storage container 2. A fixing lever 14 is turnably provided on the support rack 10. The fixing lever 14 is provided at its distal end a fixing hook 15 to be hooked on the fixing bar 16. In the drawings, the fixing hook 15 is illustrated by a broken line because it is hidden behind the frame 3. The frame 3 is fixed on the support rack 10 by hooking the fixing hook 15 on the fixing bar 16. The first position of the support rack 10 is such a position that the fixing hook 15 is hooked on the fixing bar 16 and the support rack 10 is fixed on the frame 3.

The article storage container 2 is mounted or detached when the support rack 10 is located at the first position. The article storage container 2 is detached from the article feeder 1 by detaching the mounting hooks 12 from the mounting pins 13 and then detaching the article storage container 2 from the support rack 10. The article storage container 2 is mounted on the article feeder 1 by mounting the article storage container 2 on the support rack 10 and then hooking the mounting hooks 12 on the mounting pins 13.

After the article storage container 2 is mounted, the support rack 10 is moved to the second position where the articles can be fed from the article storage container 2. With the article storage container 2 mounted on the support rack 10, the fixing hook 15 is detached from the fixing bar 16 to make the support rack 10 movable. Then, the support rack 10 is moved obliquely downward to fix the support rack 10, on which the article storage container 2 is mounted, at the second position. The second position of the support rack 10 is such a position that the articles can be fed from the article storage container 2.

The support rack 10 is mounted on the frame 3 together with the moving mechanism that moves the support rack 10 between the first position and the second position, and the support rack 10 can be fixed on the frame 3 by hooking the fixing hook 15 on the fixing bar 16. The support rack 10 is fixed at the first position. Fixing the support rack 10 on the frame 3 can facilitate attachment and detachment of the article storage container 2.

Next, the article storage container 2 is described using FIGS. 4 to 7.

Figure 4:
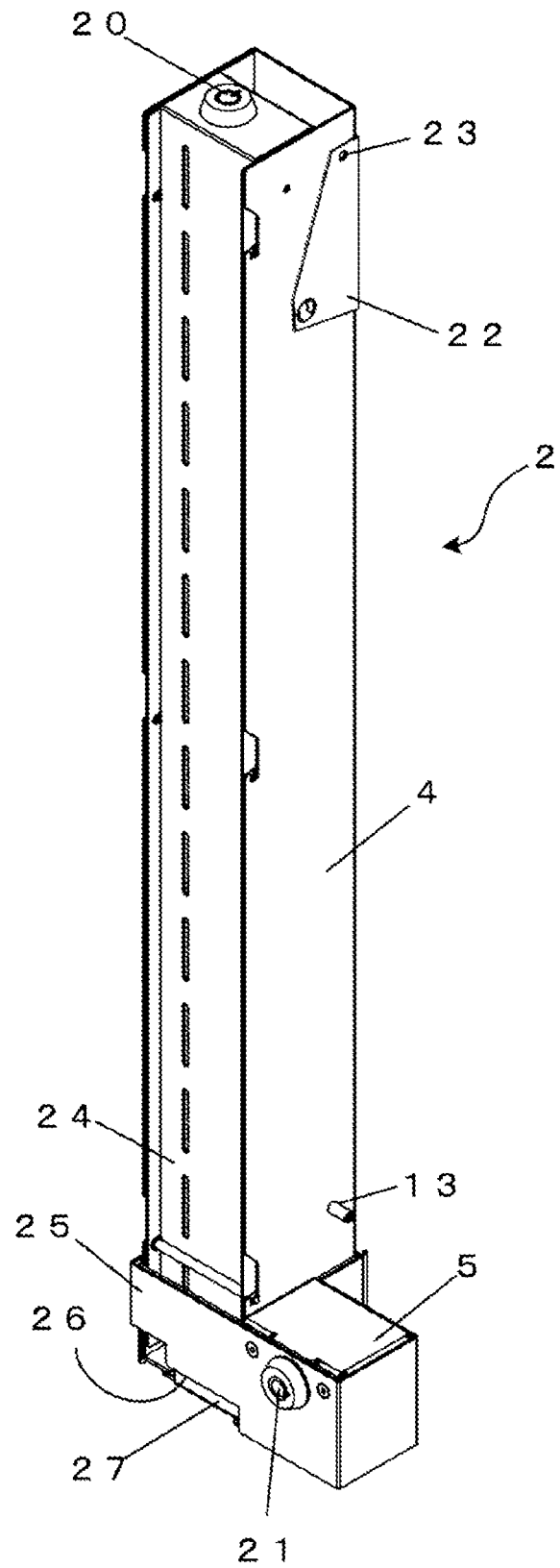
FIG. 4 is a perspective view of the article storage container.

FIG. 4 is a perspective view of the article storage container.

The article storage container 2 has a configuration such that the feed unit 5 is disposed at its lower portion and the case 4 is disposed at its upper portion. A case lock 20 is disposed at a top portion of the case 4. The case lock 20 is configured to lock a front panel 24 disposed on a front surface of the case 4. The front panel 24 is attachable to and detachable from the case 4. When the front panel 24 is detached from the case 4, an article's storage of the case 4 is exposed to the outside, which enables refill of the articles.

The mounting pins 13 are fixed on the side surfaces of the case 4. The mounting pins 13 are respectively fixed on the surfaces of the case 4 that are opposed to each other.

A stand 22 is turnably fixed on a stand shaft 23 at an upper portion of the case 4. The stand 22 is used when the article storage container 2 is laid down. By laying the article storage container 2 sideways with the stand 22 standing, it is possible to dispose the article storage container 2 in an oblique position. Such an oblique position facilitates refill of the articles into the storage of the case 4.

A front surface 25 is a front side surface of the feed unit 5. An article outlet port 26 is provided in the front surface 25. A shutter 27 is a cover configured to open and close the outlet port 26. When the shutter 27 is open, the articles stored in the case 4 can be taken out through the outlet port 26. When the shutter 27 is closed, the articles stored in the case 4 cannot be taken out through the outlet port 26. The shutter 27 is bent toward the bottom side and partially covers the bottom surface.

A shutter lock 21 is provided on the front surface 25. The shutter lock 21 is an operation unit configured to open and close the shutter 27 and, at the same time, a lock configured to restrict the movement of the shutter 27. The shutter 27 is operated by inserting a key into the shutter lock 21 and turning the key. For example, the shutter 27 is closed when the key is turned right whereas the shutter is opened when the key is turned left. The shutter 27 cannot be opened and closed without the key.

Figure 5:
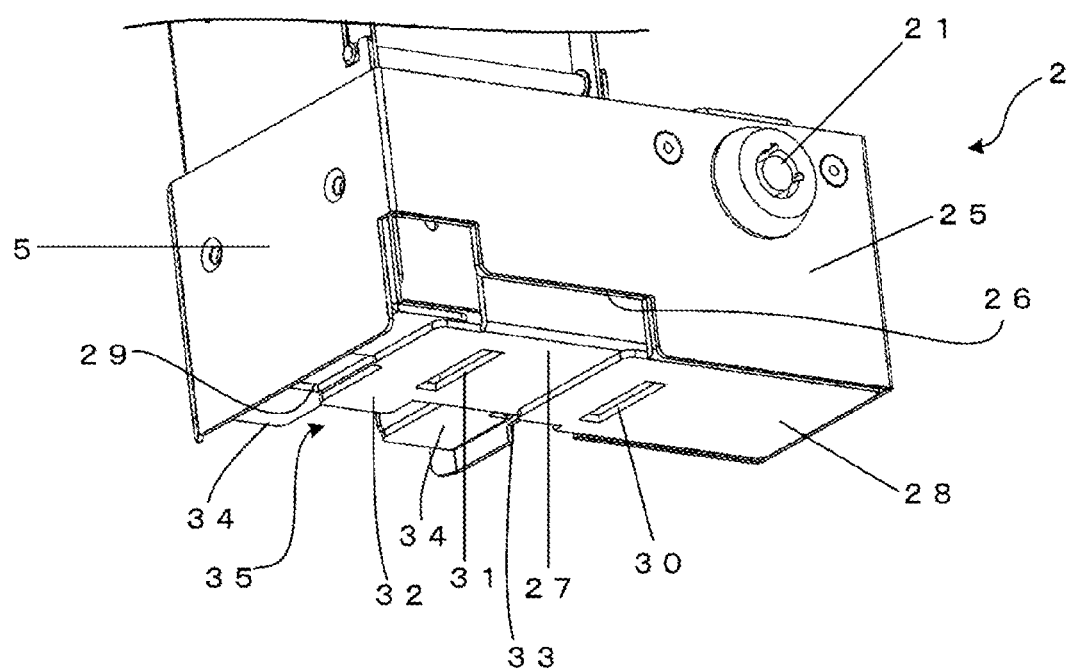
FIG. 5 is a view of the article storage container at and around an outlet port.

FIG. 5 is a view of the article storage container at and around the outlet port.

Bottom support plates 34 on which to place the articles are provided on the bottom side of the feed unit 5. The bottom support plates 34 are arranged on left and right sides, and an opening is provided between these left and right bottom support plates. A movable body inlet 35 is provided on the back side of the feed unit 5. The opening sandwiched between the left and right bottom support plates 34 communicates with the movable body inlet 35 and the outlet port 26. The shutter 27 covers the opening and the outlet port 26 so that the articles may not be taken out therethrough. The shutter 27 extends from the portion where it covers the outlet port 26 to the bottom side of the feed unit 5.

The outlet port 26 is disposed on the front side of the feed unit 5 while the moving body inlet 35 is disposed on the back side of the feed unit 5 which is opposite the front side thereof. The movable body pushes out each of the articles from the article storage container 2 and feeds it to the outside. The movable body is to be described in detail later. The movable body enters the inside of the feed unit 5 through the movable body inlet 35. Then, the movable body passes through the opening between the bottom support plates 34, pushes one of the articles located at the lowest position out of the articles stacked on the bottom support plates 34, and feeds the article through the outlet port 26.

The shutter 27 includes a contact portion 32. For example, the contact portion 32 is a plate that protrudes from an edge of the shutter 27. The contact portion 32 is a part of the shutter 27. The contact portion 32 moves in association with the movement of the shutter 27. The feed unit 5 includes a notch 33 on the back side thereof so as not to hinder the movement of the contact portion 32.

The feed unit 5 includes, on the bottom side thereof, a sensor through hole 29 for detecting whether or not any article exists. A sensor disposed outside the feed unit 5 detects whether or not any article exists through the sensor through hole 29. The sensor through hole 29 may be a hole provided in the bottom support plates 34, or alternatively a part of the opening between the bottom support plates 34 may be used as the sensor through hole 29.

The feed unit 5 includes a bottom plate 28 on the bottom side thereof. The bottom plate 28 includes a detection through hole 30 for detecting whether the shutter 27 is open or closed. The shutter 27 includes a shutter through hole 31 for detecting whether the shutter 27 is open or closed. When the shutter 27 is open, the shutter through hole 31 is moved to the position of the detection through hole 30. When the shutter 27 is closed, the detection through hole 30 is shielded by the shutter 27. The state of the detection through hole 30 changes depending on whether the shutter 27 is open or closed. When a plate is inserted into the shutter through hole 31 and the detection through hole 30 at the same time, the movement of the shutter 27 is stopped. The feed unit 5 is larger in the width direction than the case 4 so that it can cover the moving range of the shutter 27. The detection through hole 30 is disposed at a portion of the feed unit 5 which protrudes from the case 4 in the width direction. Likewise, the shutter lock 21 is also disposed at the portion of the feed unit 5 which protrudes from the case 4 in the width direction.

Figure 6:
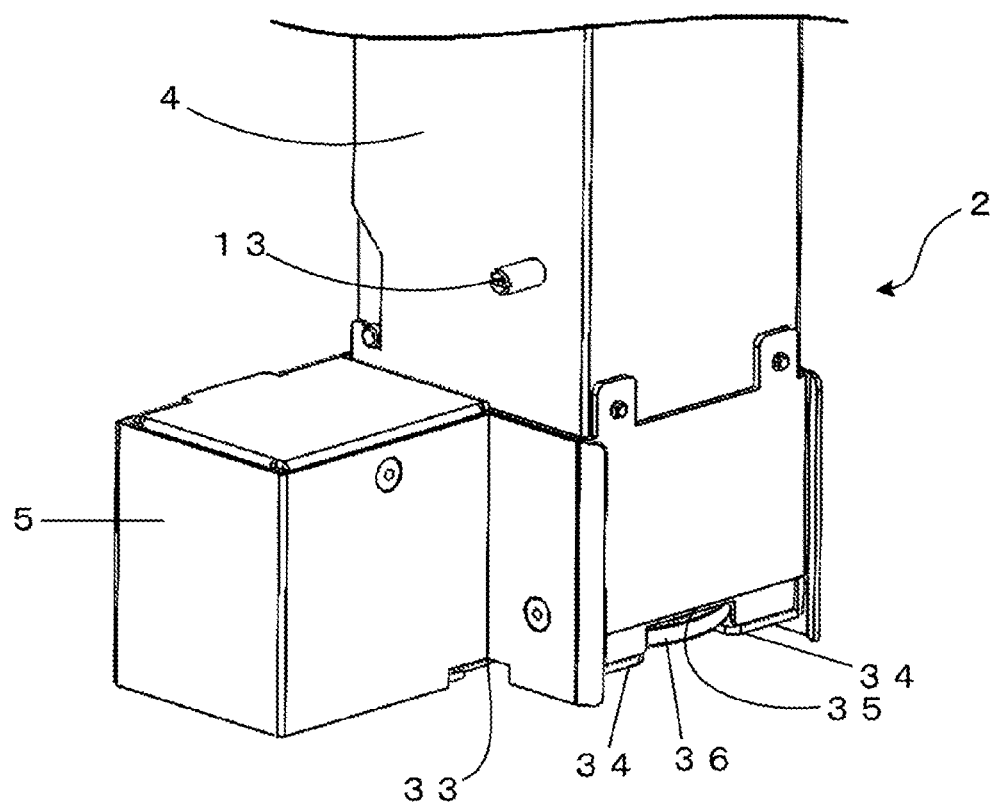
FIG. 6 is a view explaining a back side opening of the article storage container.

FIG. 6 is a view explaining a back side opening of the article storage container.

The movable body inlet 35 is provided in the back surface of the feed unit 5. The article is partially exposed through the movable body inlet 35. The movable body to be described later can pass through the movable body inlet 35 but the article cannot pass therethrough. The movable body pushes out the article by moving from the back side toward the front side of the feed unit 5.

Figure 7:
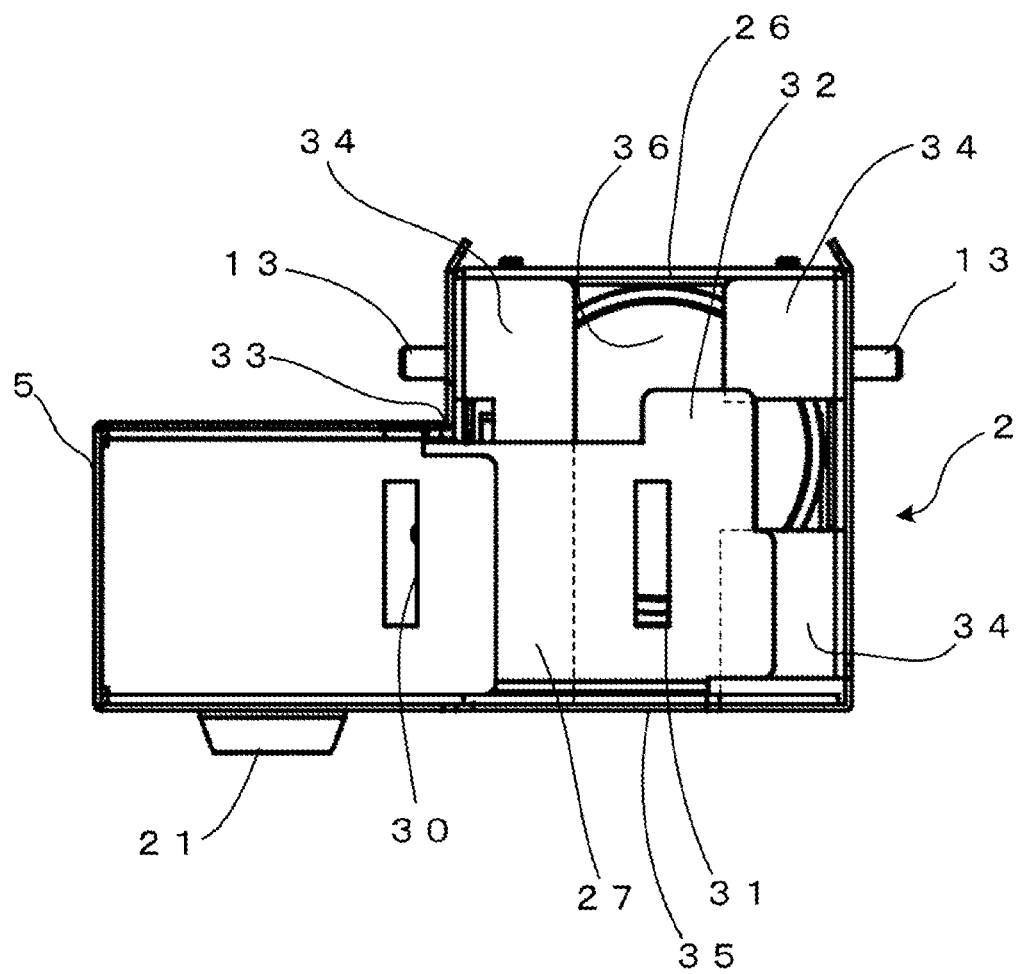
FIG. 7 is a bottom view of the article storage container.

FIG. 7 is a bottom view of the article storage container.

The bottom support plates 34 are partially covered with the shutter 27. Portions of the bottom support plates 34 which are covered with the shutter 27 are illustrated by broken lines. When the shutter 27 is closed, a token 36 being the article cannot be taken out. The openings of the detection through hole 30 and the shutter through hole 31 are of approximately the same shape. When the shutter 27 is fully open, the detection through hole 30 and the shutter through hole 31 overlap with each other. When the shutter 27 is not fully open, the detection through hole 30 is covered with the shutter 27. When the shutter 27 is opened, the distal end of the shutter 27 overlaps with the bottom support plates 34. When the shutter 27 is opened, the contact portion 32 sticks out from the notch 33 toward the outside of the feed unit 5. When the shutter 27 is opened, the movable body inlet 35 and the outlet port 26 communicate with each other on the bottom side of the feed unit 5 through the opening between the bottom support plates 34.

Figure 8:
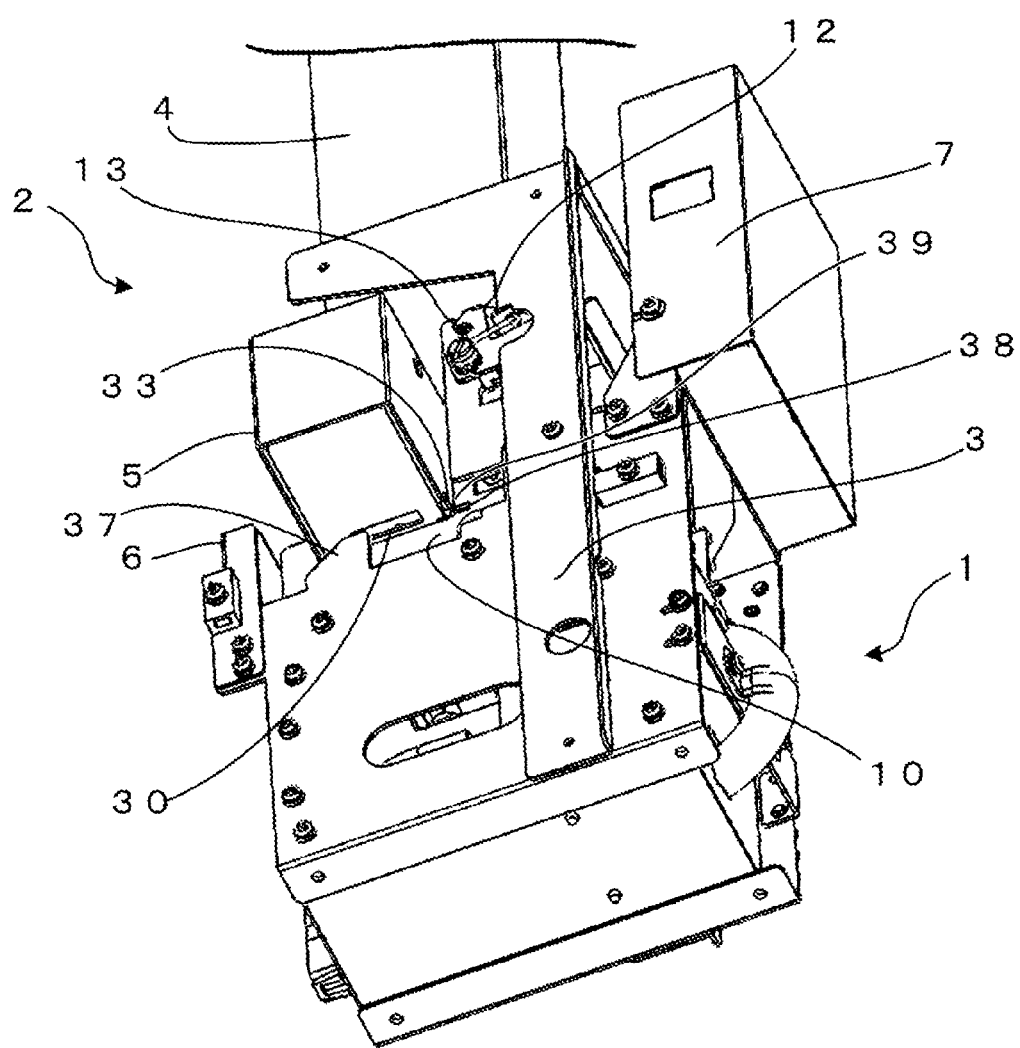
FIG. 8 is a partial perspective view of the article feeder viewed from the bottom side thereof.

FIG. 8 is a partial perspective view of the article feeder viewed from the bottom side thereof.

The support rack 10 includes an engagement concave portion 38. When the article storage container 2 is mounted on the support rack 10, the position of the engagement concave portion 38 corresponds to the position of the notch 33. When the article storage container 2 is mounted on the support rack 10 and the shutter 27 is open, the contact portion 32 gets into the indentation of the engagement concave portion 38. In this case, the article storage container 2 cannot be detached from the article feeder 1. When the article storage container 2 is mounted on the support rack 10 and the shutter 27 is closed, the contact portion 32 is detached from the engagement concave portion 38. In this case, the article storage container 2 can be attached to and detached from the article feeder 1. Whether the article storage container 2 can be attached to and detached from the article feeder 1 is controlled depending on whether the shutter 27 is open or closed. The article storage container 2 can be attached to and detached from the article feeder 1 when the shutter 27 is closed and the support rack 10 is located at the first position.

In addition, the engagement concave portion 38 is an engagement portion to engage with the contact portion 32. In a state where the contact portion 32 and the engagement concave portion 38 being the engagement portion engage with each other, the article storage container 2 cannot be detached from the support rack 10. The engagement concave portion 38 is provided in a wall that stands perpendicularly to a surface of the support rack 10 on which to mount the article storage container 2. This wall is a sheet metal constituting the support rack 10, and stands in a direction intersecting with the movement direction of the shutter 27 and the contact portion 32.

When the article storage container 2 is to be mounted on the support rack 10 with the shutter 27 opened, it cannot be mounted on the support rack 10 because the contact portion 32 comes into contact with the wall where the engagement concave portion 38 of the support rack 10 is disposed. This wall is a to-be-contacted portion 39 to be brought into contact with the contact portion 32. For example, the to-be-contacted portion 39 is a wall disposed in the middle of a mounting route used for mounting the article storage container 2 on the support rack 10. Although the embodiment has described the example in which the to-be-contacted portion 39 is disposed in a component constituting the support rack 10, the to-be-contacted portion 39 may be disposed at another location, e.g. the frame 3, in the middle of the mounting route used for mounting the article storage container 2. In a state where the shutter 27 is closed, the contact portion 32 that moves in conjunction with the shutter 27 is never brought into contact with the to-be-contacted portion 39. In this case, the article storage container 2 can be mounted on the support rack 10.

Although the embodiment has described the example using the part of the shutter 27 as the contact portion 32, the embodiment is not limited to this and the contact portion 32 may be a pin or plate fixed on the shutter 27. In addition, although the engagement concave portion 38 is used as the engagement portion to mate with the contact portion 32, the engagement portion may be a protrusion, pin, plate, or the like instead of the indentation. Further, the contact portion 32 has only to be connected to the shutter 27 directly or indirectly. Any configuration may be employed as long as the contact portion 32 moves in conjunction with the shutter 27 and the engagement portion engages with or moves away from the contact portion 32 depending on whether the shutter 27 is open or closed.

The frame 3 includes a guide protrusion 37. When the article storage container 2 is mounted on the article feeder 1 and the support rack 10 is located at the second position, the guide protrusion 37 is inserted into the detection through hole 30 and the shutter through hole 31 and engages with them. When the shutter 27 is closed, the detection through hole 30 is covered with the shutter 27. When the support rack 10 is moved from the first position to the second position at this time, the detection through hole 30 covered with the shutter 27 prevents the guide protrusion 37 from entering it. The guide protrusion 37 comes into contact with the front surface of the shutter 27. The support rack 10 cannot be moved to the second position. The guide protrusion 37 can be regarded as a contact portion, the shutter through hole 31 can be regarded as an engagement portion, and the front surface of the shutter 27 can be regarded as a to-be-contacted portion.

When the shutter 27 is open, the detection through hole 30 communicates with the inside and outside through the shutter through hole 31 of the shutter 27. In this case, the support rack 10 can be moved from the first position to the second position. The guide protrusion 37 enters the detection through hole 30 and the shutter through hole 31, whereby the support rack 10 can be moved to the second position. When the support rack 10 is at the second position, the article feeder 1 can feed the articles from the article storage container 2. After the article storage container 2 is mounted on the support rack 10, whether the support rack 10, on which the article storage container 2 is mounted, can be moved from the first position to the second position is controlled depending on whether the shutter 27 is open or closed.

The second position of the support rack 10 is located below the first position in the front direction of the article feeder 1. The guide protrusion 37 includes a surface that is inclined to the back side of the article feeder 1 as it gets closer to its distal end so as to correspond to the moving trajectory of the support rack 10. When the shutter 27 is closed, the distal end of the guide protrusion 37 comes into contact with the shutter 27 at the initial stage of the movement of the support rack 10, which can prevent the movement of the support rack 10.

When the contact portion 32 is regarded as a first contact portion and the engagement concave portion 38 is regarded as a first engagement portion, the guide protrusion 37 can be regarded as a second contact portion and the shutter through hole 31 can be regarded as a second engagement portion.

When the support rack 10 on which the article storage container 2 is mounted is located at the second position, the guide protrusion 37 and the shutter through hole 31 engage with each other and prevent the movement of the shutter 27. At this time, even in the case of trying to close the shutter 27, a side surface of the guide protrusion 37 is brought into contact with an inner circumferential wall of the through hole constituting the shutter through hole 31 and prevents the movement of the shutter 27. When the article storage container 2 mounted on the support rack 10 is located at the second position, the shutter 27 cannot be closed. The side surface of the guide protrusion 37 can be regarded as a to-be-contacted portion, and the inner circumferential wall of the through hole constituting the shutter through hole 31 can be regarded as a contact portion. The movement direction of the shutter through hole 31 is the same direction as the movement direction of the shutter 27. The shutter through hole 31 is disposed at the center in the width direction of a bottom surface of the shutter 27. The guide protrusion 37 and the shutter through hole 31 are formed so as to extend in the width direction of the bottom surface of the shutter 27. The width of each of the shutter through hole 31 and the guide protrusion 37 is approximately half the width of the bottom surface. By making them wide, it is possible to reduce wobbling and the like, increase a stroke of the movement of the support rack 10, and suitably restrict the movement of the shutter 27.

When the contact portion 32 is regarded as a first contact portion, the engagement concave portion 38 is regarded as a first engagement portion, the guide protrusion 37 is regarded as a second contact portion, and the shutter through hole 31 is regarded as a second engagement portion, the inner circumferential wall of the through hole constituting the shutter through hole 31 can be regarded as a third contact portion and the side surface of the guide protrusion 37 can be regarded as a third engagement portion.

When the support rack 10 on which the article storage container 2 is mounted is located at the first position, even if the shutter 27 is opened, the outlet port 26 is prevented from being exposed to the outside by the shielding plate 6. When the support rack 10 is located at the first position, the articles cannot be taken out from the article storage container 2 by the action of the shielding plate 6.

The detection through hole 30 does not necessarily have to be provided. Although the embodiment has described the example in which the guide protrusion 37 is provided in the frame 3, it may be provided in any other location in the article feeder 1. For example, the guide protrusion may be disposed in the middle of a movement route of the support rack 10. Although the embodiment has described the example in which the guide protrusion 37 is a protrusion provided in the frame 3 and the shutter through hole 31 is an opening provided in the shutter 27, these protrusion and opening may be placed vice versa, or alternatively, other combinations such as a hook and a lever may be used instead of the protrusion and opening. Any configuration may be employed as long as an object that moves in conjunction with the shutter 27 and an object that engages with this object moving in conjunction therewith are provided, the movement of the support rack 10 can be controlled according to the state of the object moving in conjunction therewith, and whether the shutter can be opened or closed can be controlled according to the state of the object moving in conjunction therewith. In addition, a mechanism that controls the movement of the support rack 10 and a mechanism that controls whether to open or close the shutter may be provided as separate units.

Figure 9:
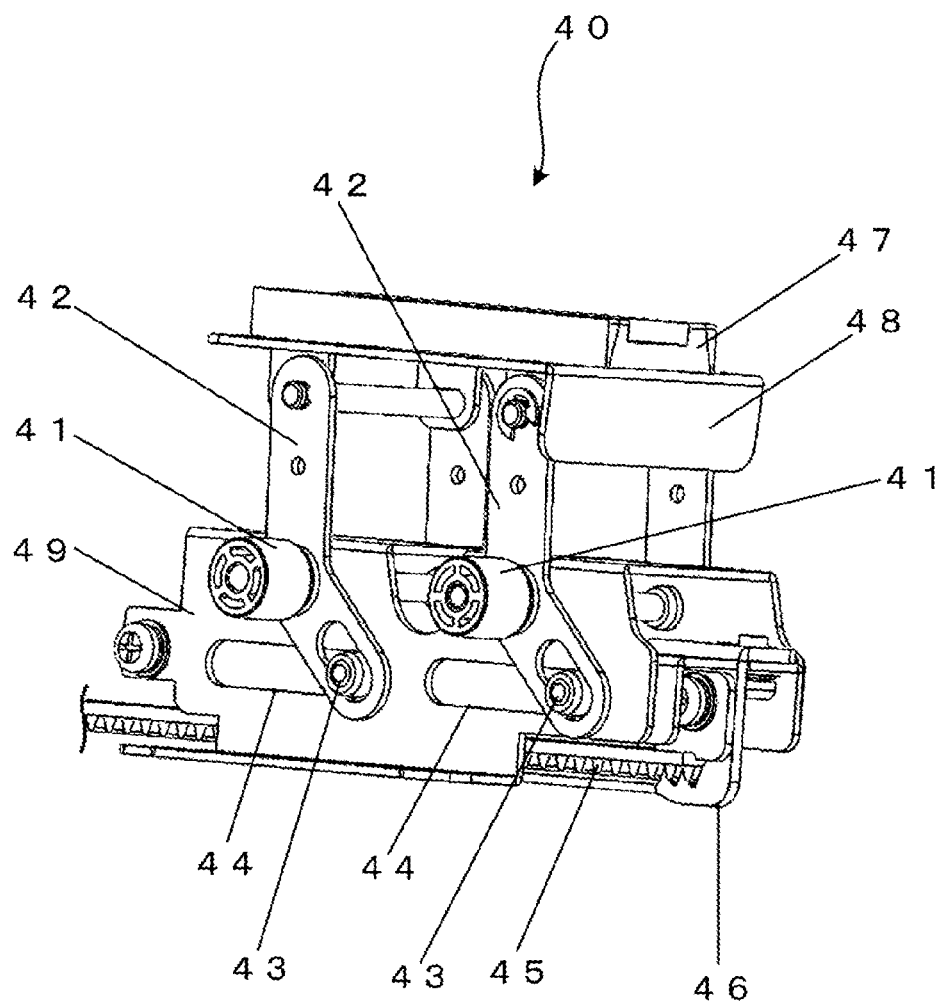
FIG. 9 is a view explaining a movable body of the article feeder.

FIG. 9 is a view explaining a movable body of the article feeder.

A movable body unit 40 includes a movable body 47. The movable body unit 40 moves, and the token 36 is pushed by the movable body 47. The movable body 47 is fixed on a link support rack 48.

A base 49 includes a fixation portion 46 that fixes the base 49 on a belt 45. The belt 45 is driven by a motor (not illustrated) to move the base 49.

The base 49 includes rollers 41 on both sides thereof. Two pairs of rollers constituted of the rollers 41 arranged on both sides are arranged on the base 49. The rollers 41 are moved along rails to be described later.

Link arms 42 with the axes of the rollers 41 as their fulcrums are arranged on the base 49 so as to correspond to the axes of the respective rollers 41. Each link arm 42 bends about the corresponding axis. One end part of the link arm 42 is connected to the link support rack 48. The other end part of the link arm 42 includes a long hole. The base 49 includes long holes that each extend in a longitudinal direction of the movable body unit 40. The long hole of the link arm 42 and the corresponding long hole of the base 49 intersect with each other. The long hole of the link arm 42 and the long hole of the base 49 are coupled to each other via a movable shaft 43. When the movable shaft 43 is located at a front-side end of the long hole of the base 49, the movable body 47 is located at a pushing position which is the highest position. In this case, the movable body unit 40 pushes the token 36 while moving from the back side to the front side of the article feeder 1. Meanwhile, in this case, the movable body 47 sometimes stops with the article placed thereon and stands by instead of feeding the article. When the movable shaft 43 is located at a back-side end of the long hole of the base 49, the movable body 47 is located at a bypass position which is the lowest position. In this case, the movable body unit 40 moves from the front side to the back side of the article feeder 1 without coming into contact with the token 36. The movable body 47 is moved below the token 36 to the back side while keeping away from the token.

Figure 10:
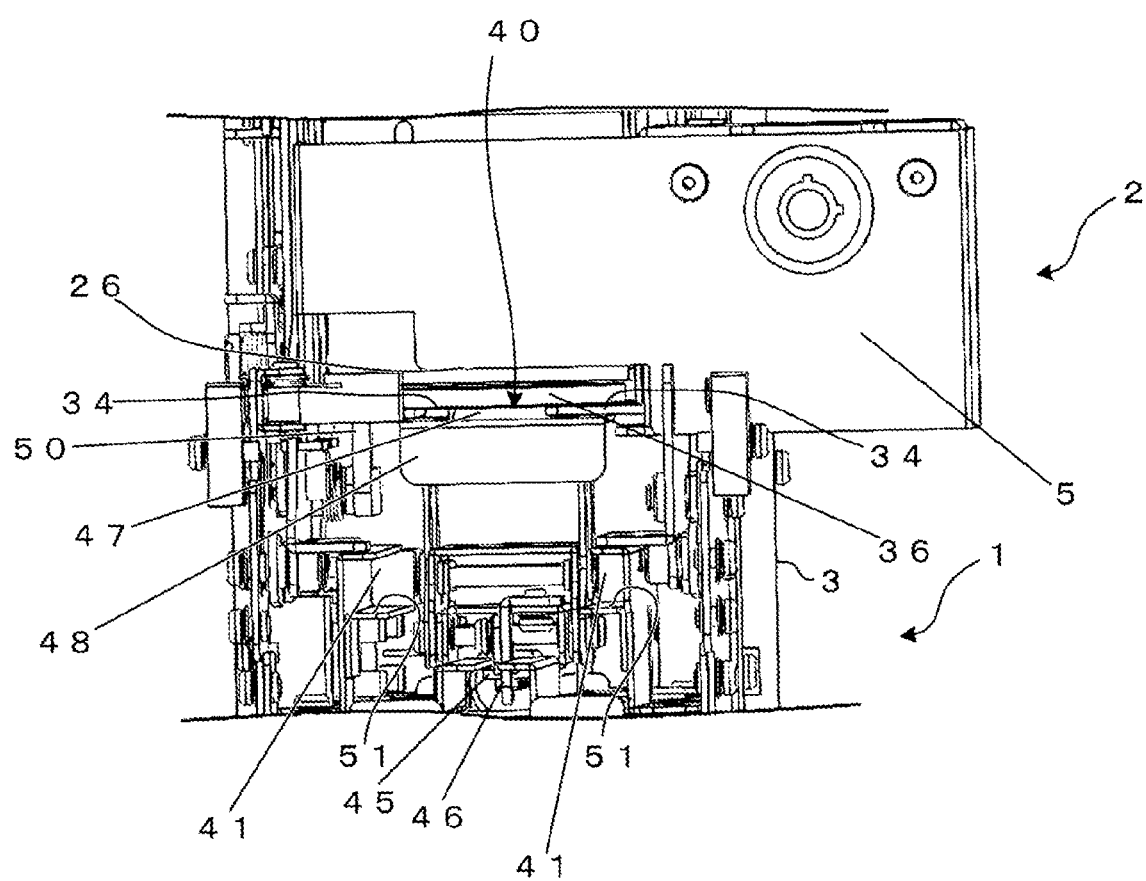
FIG. 10 is a first view explaining the operation of the article feeder.
Figure 11:
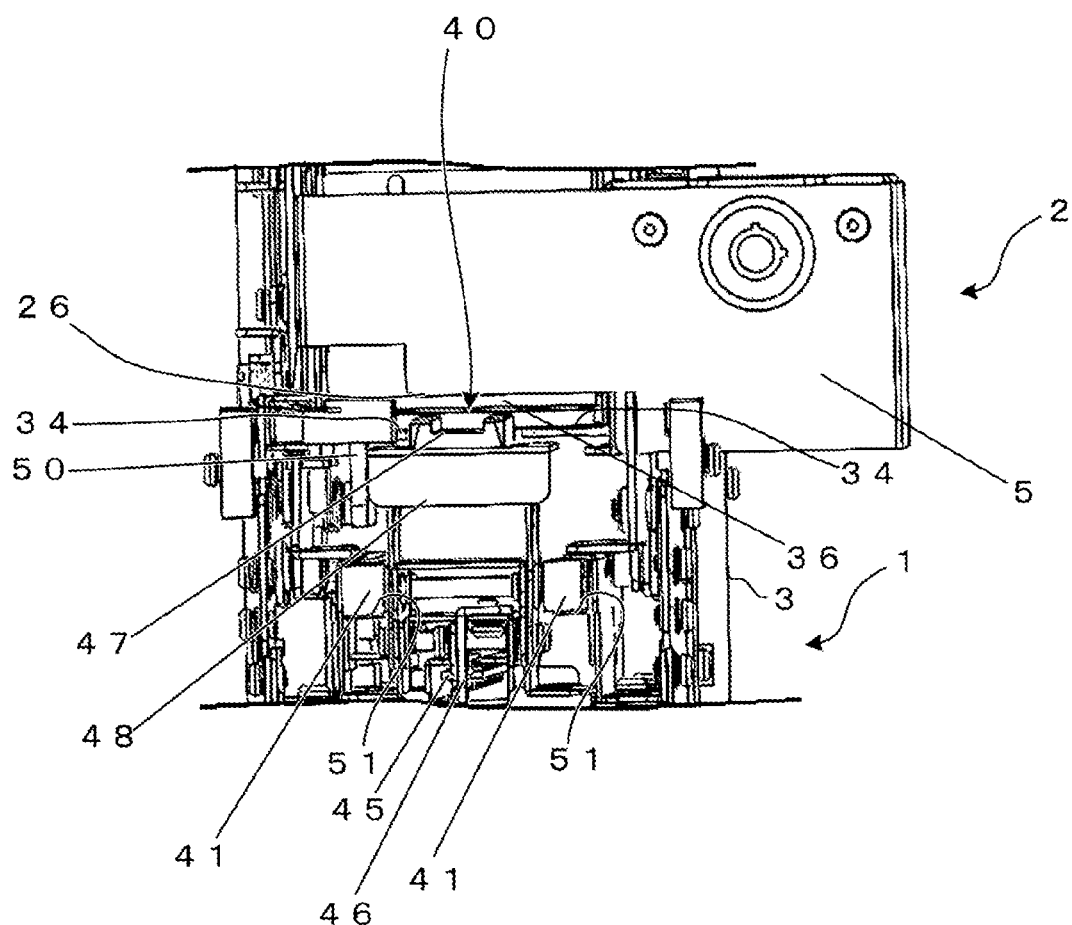
FIG. 11 is a second view explaining the operation of the article feeder.

Next, the article feeding operation of the article feeder is described using FIGS. 10 and 11. FIG. 10 is a first view explaining the operation of the article feeder. FIG. 11 is a second view explaining the operation of the article feeder. FIG. 10 illustrates a state where the movable body 47 is located on the movable body inlet 35 side and a state observed before the movable body 47 pushes the token 36. FIG. 11 illustrates a state where the movable body 47 is on the outlet port 26 side and a state observed after the movable body 47 pushes the token 36. The operation of the article feeder 1 is controlled by a control unit (not illustrated). For example, the control unit is a control circuit that includes a CPU and a memory, and controls the operations of components such as a motor, a solenoid, and a sensor according to a program.

The frame 3 includes rails 51. The rollers 41 roll along the rails 51. The movable body unit 40 reciprocates between the back side and the front side of the article feeder 1 by the belt 45. The movable body 47 is located at the pushing position when the movable body 47 is moved from the back side to the front side, whereas the movable body is located at the bypass position when the movable body 47 is moved from the front side to the back side. When the article feeder 1 is in a standby state where the article feeder feeds no token 36, the movable body 47 stops with the token 36 placed thereon. At this time, the movable body 47 stops between the bottom support plates 34 with the token 36 placed thereon.

Next, a description is given of a case where the article feeder 1 is in an article feeding state of feeding the token 36. First, the movable body 47 is moved to the bypass position, and the token 36 is placed on the bottom support plates 34. Next, the movable body 47 passes below the token 36 to be moved to the back side. Then, the movable body 47 is moved to the pushing position and passes through the movable body inlet 35 to push and feed the token 36 located at the lowest position. The token 36 located at the second lowest position is held by a plate forming the outlet port 26 and is thus not fed. In addition, after the token 36 located at the lowest position is fed, the token 36 located at the second lowest position becomes a state of being placed on the movable body 47. In the case of feeding only one token 36, the movable body stops in this state. In the case of consecutively feeding the token 36, the movable body 47 iterates the operation of being moved to the bypass position after pushing the token 36 and then being moved to the back side to push the next token 36.

The token 36 to be pushed out from the article storage container 42 by the movable body 47 is directly placed on the bottom support plates 34. The token 36 located at the second lowest position is held by the plate forming the outlet port 26 and is thus not fed. After the token 36 located at the lowest position is pushed out, the tokens 36 located at the second lowest and higher positions drop to be supported by the movable body 47. The opening of the outlet port 26 has a height large enough for only one token to pass therethrough. In a state of being supported by the movable body 47, the token 36 is blocked by the plate forming the outlet port 26 and cannot be taken out from the outlet port 26. In another example, the height of the outlet port 26 may be adjustable. By making an upper plate forming the outlet port 26 have a vertically movable mechanism, it is possible to make the article storage container suitable to articles of various heights.

The standby position of the movable body 47 is a position observed when the token 36 is pushed out to the outside. When the movable body 47 is located at the standby position, the moving mechanism of the support rack 10 moves the support rack 10 from the first position to the second position. The movable body 47 pushes up the token 36 located at the lowest position of the article storage container 2 and moves it away from the bottom support plates 34. When the support rack 10 is moved to the second position, the token 36 becomes a state of being placed on the movable body 47. The token 36 cannot be taken out by the action of the plate forming the outlet port 26. In the case of mounting the article storage container 2, the control unit (not illustrated) performs control to move the movable body 47 to the standby position.

A token detection lever 50 is mounted on the frame 3. When the token 36 is stored in the article storage container 2, the movement of the token detection lever 50 is restricted by the token 36 and thus the lever is not inserted into the sensor through hole 29 deeply. When the token 36 is not stored in the article storage container 2, the movement of the token detection lever 50 is not restricted by the token 36 and thus the lever is inserted into the sensor through hole 29 deeply. Whether the token 36 exists in the article storage container 2 can be detected according to the movement position of the token detection lever 50. The control unit (not illustrated) can acquire information on whether the token 36 exists in the article storage container 2 and use the information for control.

What is claimed is:

1. An article feeder comprising:
    an article storage container which stores articles stacked one on top of another;
    a movable body which pushes one of the articles located at the lowest position out of the articles stored in the article storage container and feeds the article to the outside of the article storage container;
    a support rack on which to mount the article storage container;
    an outlet port which is provided in the article storage container and used for the article to be fed to the outside;
    a shutter which is provided in the article storage container and configured to open and close the outlet port;
    a first contact portion which is connected to the shutter;
    a first engagement portion which is configured to engage with the first contact portion; and
    a to-be-contacted portion which is provided in the middle of a route used for mounting the article storage container on the support rack, comes into contact with the first contact portion when the shutter is open, and does not come into contact with the first contact portion when the shutter is closed, wherein
    the first contact portion and the first engagement portion engage with each other by opening the shutter and the first contact portion and the first engagement portion disengage from each other by closing the shutter in a state where the article storage container is mounted on the support rack, detachment of the article storage container from the support rack is not prevented by the first contact portion and the first engagement portion when the article storage container is mounted on the support rack with the shutter closed, and the detachment of the article storage container from the support rack is prevented by the first contact portion and the first engagement portion when the article storage container is mounted on the support rack with the shutter open, and
    mounting of the article storage container on the support rack is not prevented by the first contact portion and the to-be-contacted portion in the case of mounting the article storage container on the support rack with the shutter closed, and the mounting of the article storage container on the support rack is prevented by the first contact portion and the to-be-contacted portion in the case of mounting the article storage container on the support rack with the shutter open.

2. The article feeder according to claim 1, further comprising:
    a frame on which the movable body and the support rack are mounted; and
    a moving mechanism which is provided in the frame and configured to move the support rack to a first position and a second position, wherein
    the article storage container is mounted and detached at the first position, and the article stored in the article storage container is fed by the movable body at the second position.

3. The article feeder according to claim 2, wherein
    the first contact portion is a part of the shutter, the first engagement portion is a concave portion that is provided in a wall of the support rack intersecting with a movement direction of the first contact portion, and the to-be-contacted portion is the wall.

4. The article feeder according to claim 3, further comprising a first hook which is configured to fix the article storage container on the support rack and a second hook which is configured to fix the support rack on the frame.

5. The article feeder according to claim 2, wherein, when the article feeder is in a standby state where the support rack on which the article storage container is mounted is located at the second position and the article feeder does not feed the article, the article stored in the article storage container is placed on the movable body.

6. The article feeder according to claim 2, further comprising:
a second engagement portion which is provided in the shutter;
a second contact portion which is configured to engage with the second engagement portion; and
a second to-be-contacted portion which is provided in the shutter and comes into contact with the second contact portion, wherein
when the shutter of the article storage container mounted on the support rack is open, the second contact portion engages with the second engagement portion without coming into contact with the second to-be-contacted portion and the support rack moves from the first position to the second position, and
when the shutter of the article storage container mounted on the support rack is closed, the second contact portion comes into contact with the second to-be-contacted portion without engaging with the second engagement portion and the support rack is prevented from moving from the first position to the second position.

7. The article feeder according to claim 6, wherein, when the support rack on which the article storage container is mounted is located at the second position, the shutter is open and the shutter is prevented from opening and closing by engagement between the second contact portion and the second engagement portion.

8. The article feeder according to claim 6, wherein
the second contact portion is a protrusion which protrudes from the frame,
the shutter covers the outlet port of the article storage container and extends on the bottom side thereof,
the second engagement portion is a through hole of the shutter which is provided in a bottom surface of the article storage container, and
the second to-be-contacted portion is the shutter which extends on the bottom side.

9. The article feeder according to claim 2, further comprising:
a third contact portion which is provided in the shutter and moves in conjunction with the shutter; and a third engagement portion which is configured to engage with the third contact portion, wherein
when the support rack on which the article storage container is mounted is located at the second position, the third contact portion and the third engagement portion engage with each other and movement of the shutter is prevented.

10. The article feeder according to claim 9, wherein
the article storage container includes, in a bottom surface thereof, a first through hole through which the shutter is exposed,
the shutter includes a second through hole at a position corresponding to the first through hole observed when the shutter is open,
the frame includes a protrusion,
the third contact portion is the second through hole and the third engagement portion is the protrusion, and
when the support rack on which the article storage container is mounted is located at the second position, the protrusion is inserted into the second through hole through the first through hole and the movement of the shutter is prevented by an inner circumferential wall forming the second through hole and the protrusion that come into contact with each other.

11. An article storage container configured to store articles stacked in a line, comprising:
a case which stores the articles;
an outlet port which is provided below a front surface of the case and used for feeding the articles to the outside;
a shutter which is configured to open and close the outlet port;
a shutter lock which is configured to perform an operation of opening and closing the shutter; and
a first contact portion which is connected to the shutter and configured to engage with or disengage from a first engagement portion that is disposed in a support rack which is disposed outside the article storage container and on which to mount the article storage container.

12. The article storage container according to claim 11, further comprising a second engagement portion which is provided in the shutter and configured to engage with or disengage from a second contact portion that is disposed in a frame which is disposed outside the article storage container and on which to mount the support rack.

13. The article storage container according to claim 12, wherein
the first contact portion is a part of the shutter, engages with the first engagement portion when the shutter is opened, and disengages from the first engagement portion when the shutter is closed, and
the second engagement portion is a part of the shutter, does not engage with the second contact portion when the shutter is closed, and engages with the second contact portion when the shutter is opened.

* * * * *